United States Patent [19]

Taylor

[11] 4,251,694
[45] Feb. 17, 1981

[54] TONE-RINGING CIRCUITS AND METHODS FOR TELEPHONE SETS

[75] Inventor: Raymond G. Taylor, Shreveport, La.

[73] Assignee: Western Electric Company, Inc., New York, N.Y.

[21] Appl. No.: 67,080

[22] Filed: Aug. 16, 1979

[51] Int. Cl.³ .............................................. H04M 1/26
[52] U.S. Cl. ................................................... 179/84 T
[58] Field of Search .............. 179/81 R, 84 R, 84 T, 179/159

[56] References Cited

U.S. PATENT DOCUMENTS

| | | | |
|---|---|---|---|
| 2,322,851 | 6/1943 | Kalb | 179/159 |
| 2,673,252 | 3/1954 | Henrikson | 179/159 |
| 2,686,844 | 8/1954 | Brewer | 179/81 R |
| 3,459,899 | 8/1969 | Lane et al. | 179/84 T |
| 3,467,788 | 9/1969 | Why et al. | 179/84 T |
| 3,594,515 | 7/1971 | Brown | 179/84 T |
| 3,864,532 | 2/1975 | Van Der Plaats et al. | 179/84 T |
| 3,867,585 | 2/1975 | Morstadt | 179/84 T |

FOREIGN PATENT DOCUMENTS 1178695  1/1970  United Kingdom ............... 179/84 T Primary Examiner—Raymond F. Cardillo, Jr.
Assistant Examiner—Joseph A. Popek
Attorney, Agent, or Firm—J. L. Landis

[57] ABSTRACT

In the on-hook state of a set of telephone line-switch contacts (LS-1 to LS-5), an incoming low-frequency ringing signal (A) from the central office is rectified (14) and applied to an oscillator circuit (16), which drives the receiver (11) of the telephone handset (21) as the transducer for the tone ringer. A protective switch (20) is used to disable the oscillator circuit from producing an output to the receiver whenever the handset has been lifted from the cradle (22), so as to prevent the user from being rung in the ear if the handset is removed from the cradle and the line switch is thereafter depressed manually while the handset is in the normal listening position. The switch responds to the physical presence of the handset in the cradle, such as by using a magnetically actuated switch mounted in the cradle and operated by a magnet (24) mounted in the facing surface of the handset.

10 Claims, 2 Drawing Figures

TONE-RINGING CIRCUITS AND METHODS FOR TELEPHONE SETS

FIELD OF THE INVENTION

This application relates generally to improved tone-ringing circuits and methods, and particularly to loop-powered systems in which the telephone receiver is also used as the transducer for the tone ringer. The application particularly relates to circuits and techniques for positively disabling the operation of such tone-ringing circuits whenever the telephone handset has been lifted from the cradle, independent of the state of operation of a set of line-switch contacts.

BACKGROUND OF THE INVENTION

In the past, it has been proposed that it would be possible to use the receiver of the telephone handset as the transducer for the tone ringer, in addition to its normal function as the receiver in the speech network. In particular, R. E. C. Brown U.S. Pat. No. 3,594,515, herein incorporated by reference, contains a general disclosure of such a system, along with a detailed description of other types of tone-ringer circuits. In the Brown proposal, the telephone line-switch contacts are used, in the on-hook state, to connect an incoming low-frequency ringing signal from the central office to a rectifier circuit, which drives an oscillator circuit that in turn drives the handset receiver so as to produce the ringing tones. In the off-hook state, the line-switch contact operate to connect the receiver in the speech network in the normal fashion. Such a proposal, as generally as was described in the Brown patent, filed in 1968, appears to be attractive for various reasons in the development of new types of telephone sets, particularly in the development of electronic telephone sets to be powered solely from the central office. Advantages of such circuitry relates primarily to simplicity, compactness because the circuitry does not require local power, and potential low cost attributable to the dual use of a single receiver component for both functions.

One problem that can be encountered with any attempted use of the Brown suggestion is that, if the handset is removed from the cradle and the line switch is thereafter manually depressed for any reason while the handset receiver is being held close to the user's ear, an incoming ring signal would then activate the receiver so that the user would be "rung in the ear," meaning subjected to what would be unpleasantly loud ringing tones close to the user's ear.

SUMMARY OF THE INVENTION

Specific objects of the invention are to provide circuits and methods for disabling the operation of tone-ringing circuits as described above, whenever the handset has been lifted from the cradle and the line switch is thereafter closed, particularly for a tone ringer powered solely by a ringing voltage signal from the central office.

With the foregoing and other objects in view, circuits and methods in accordance with the invention are used in combination with tone-ringing circuits of the type wherein, in the on-hook state of a set of line-switch contacts, a low-frequency ringing signal from the central office is rectified and applied to an oscillator circuit having a high-frequency output connected to the telephone receiver to operate the receiver as the transducer for the tone ringer. In accordance with certain features of the invention, the improved system includes a protective switch, responsive to the physical presence of the handset in the cradle independent of the state of the line-switch contacts, which closes when the handset is lifted from the cradle. The switch is connected to a "disable" input terminal of the oscillator circuit so as to disable that circuit for producing an output to the receiver whenever the switch is closed, to prevent ringing of the set whenever the handset has been lifted from the cradle, regardless of the state of the line-switch contacts.

In one example, the switch includes a magnetically actuated switch mounted in the telephone cradle and a magnet mounted in the facing surface of the handset for operating the switch. Whenever the handset is lifted from the cradle, the switch closes to disable the oscillator circuit; for example, by connecting a "disable" pin of a conventional IC oscillator chip to circuit ground.

In one embodiment, a low-frequency ringing signal from the central office (such as 90 volts at 20 Hz) is applied to a diode bridge rectifier, the output of which drives a conventional IC oscillator chip, such as a "555 timer," which produces a high-frequency output signal (such as 1–2 KHz) that drives the handset receiver, such as a conventional U-3 receiver, to produce the ringing tones when connected to the oscillator output in the ring mode.

Other objects, advantages and features of the invention will be apparent from the following detailed description of specific examples and embodiments thereof, when read in conjunction with the accompanying drawings.

DETAILED DESCRIPTION

Figure 1:
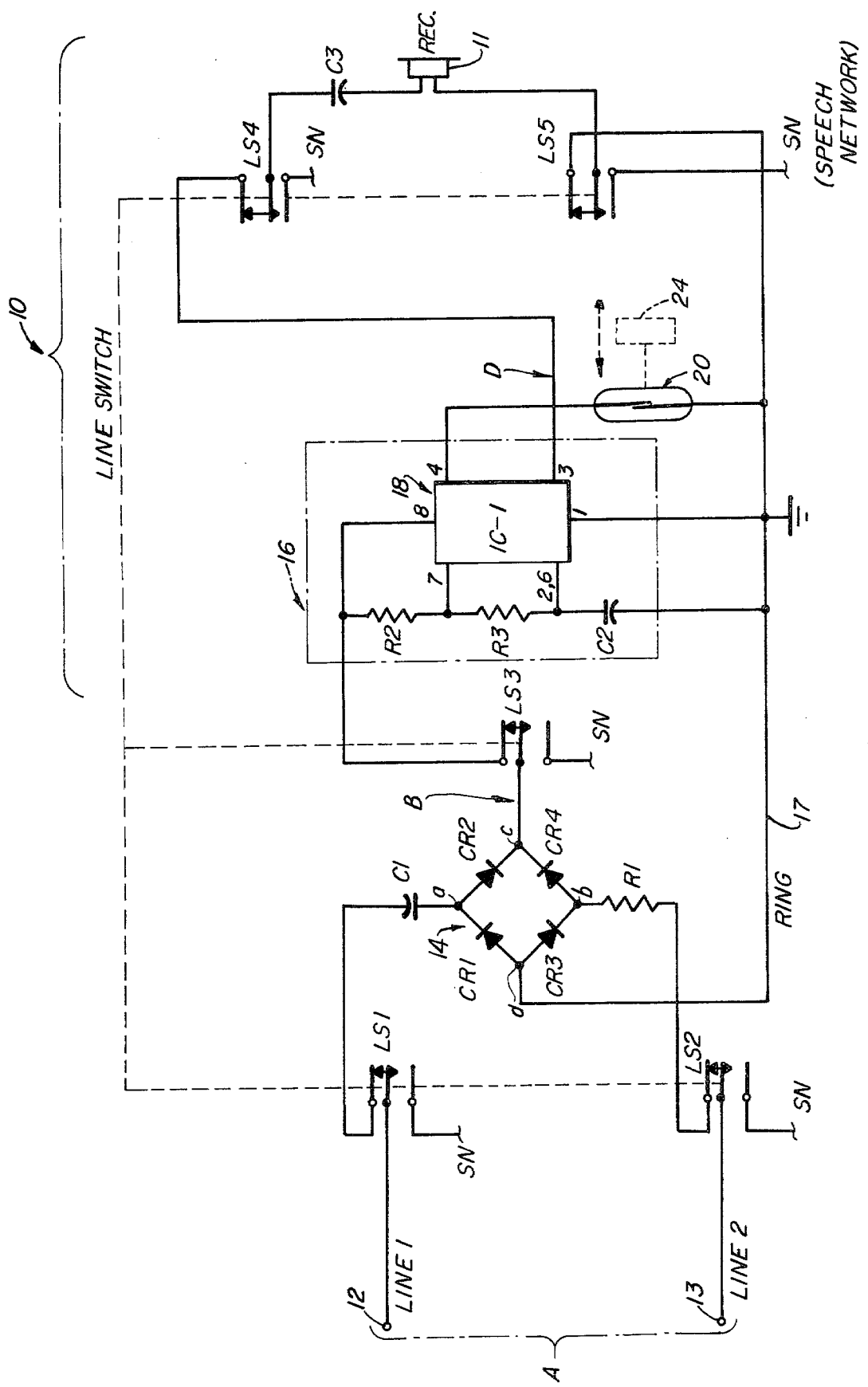
FIG. 1 is a circuit diagram of a tone-ringer circuit and components in accordance with one specific embodiment of the invention.

Referring now in detail to the drawings, and particularly to FIG. 1, there is illustrated a tone-ringing circuit 10 in accordance with one specific embodiment of the invention, for operating the receiver 11 of a conventional telephone handset as the transducer for the tone ringer when the handset is on-hook. In this circuit, a standard, low-frequency A.C. ringing signal (A) from the central office is applied to the telephone set input terminals 12 and 13 in conventional fashion. Typical ringing signals for various telephone systems may range from 30–150 volts at frequencies of 10–100 Hz; for example, 90 volts at 20 Hz, two seconds ON and four seconds OFF, in a typical American telephone system.

When the handset is on-hook, a first pair of line-switch contacts LS-1 and LS-2 are closed, and the ringing signal is applied to terminals (a) and (b) of a full-wave bridge rectifier 14 consisting of diodes CR1–CR4, via a conventional current limiting resistor R1 and a D-C blocking capacitor C1 connected as shown. Upon the application of ringing signal A, the rectifier 14 produces a composite output signal (B) at terminal c that consist of a pulsating D-C voltage modulated by an A-C voltage of a frequency twice that of ringing signal A. When ringing signal A is terminated, the composite rectifier output B decays to zero volts. In connection with this portion of the circuit, R. A. Morstadt U.S. Pat. No. 3,867,585, herein incorporated by reference, discloses details of a similar ringing input and rectifier system, for operating a different type of oscillator network to drive a miniature loudspeaker or similar transducer for reproducing the tone signals.

The output bridge terminals, (c) and (d), are connected to a generally conventional oscillator network 16 via a third line-switch contact LS-3 (closed when handset is on-hook) connected to the bridge terminal (c). The bridge terminal (d) is connected to the telephone set ring lead (17), which functions as a common circuit ground in this example. In the example illustrated, the oscillator circuit 16 includes a conventional integrated circuit oscillator chip 18, such as a "555 timer" chip available from such companies as Fairchild Camera and Instrument Corporation or Signetics Corporation, among others. Preferably, a low-powered C-MOS version of the 555 timer is used, such as a "7555 timer chip" marketed by Intersil Corporation.

The oscillator circuit further includes a generally conventional R-C network, including resistors R2 and R3 and capacitor C2, connected as shown between bridge terminals (c) and (d) and pins 1, 2, 6, 7, 8 of the chip 18. [A "control voltage" pin 5 of the chip is not used in this particular circuit; and the "trigger" input pin 2 and the "threshold" input pin 6 are connected together as shown.]

As is well known, the components R2, R3, C3 set the frequency and output characteristics of a high-frequency output signal (D) of the oscillator chip 18, at an output pin 3. The output or ringing frequency D may be selected in accordance with the characteristics of the receiver 11, typically in a range of about 750 Hz to about 2500 Hz, such as 2 KHz, modulated by the pulsating D-C signal B, in one typical example using a 555 timer chip in conjunction with a standard U-3 telephone receiver 11.

If as described hereafter, a protective switch 20 is open at this time, the oscillator 18 produces an output signal D of the desired ringing frequency at the output pin 3, which is routed to the telephone receiver 11 in the handset and to the ring lead 17 via a capacitor C3 and an additional pair of line switch contacts LS-4 and LS-5, which are also closed when the handset is on-hook. The receiver 11 serves as the transducer for the tone ringing circuit 10, to generate audible ringing tones when driven by the relatively high voltage (e.g., 10 V) oscillator output signal D. This circuit typically involves a gain of 85 db.

In so using the telephone set receiver 11 as the transducer for the tone ringing circuit 10, it is important to provide a protective or disable mechanism including the switch 20, to prevent the tone-ringer circuit 10 from operating whenever the handset (21, FIG. 2) is lifted from the cradle 22 and placed adjacent to the user's ear in normal listening position and the line switch is then manually depressed for any reason, in which case the user would be "rung in the ear," as discussed previously. To prevent this, and to permit tone ringing only when the handset 21 is resting in the normal on-hook position in the cradle 22, the protective switch 20 is provided, connected between a "reset" or "disable" oscillator terminal or pin 4 and circuit ground (the ring lead 17), so as to disable the output D at pin 3 whenever the switch 20 is closed. This "disable" function of the oscillator chip 18, by grounding the pin 4, is generally well known.

Figure 2:
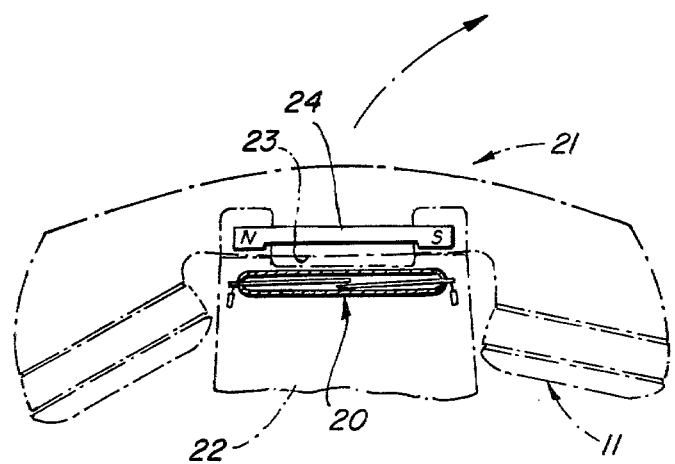
FIG. 2 is a partially diagrammatic front view of a telephone handset and cradle assembly, illustrating an arrangement of a protective switch and magnet assembly in accordance with one embodiment of the invention.

In a specific embodiment of the invention illustrated in FIG. 2, the switch 20 consists of a normally closed sealed-contact reed switch embedded in the upper surface of the cradle 22 adjacent to and facing the center of the facing surface 23 of the handset 21, when in the normal on-hook position. In this example, a permanent magnet 24 is embedded in the facing surface 23 of the handset, so as to open the switch 20, to permit ringing, only when the handset 21 is in the hang-up position in the cradle 22. When the handset 21 is lifted from proximity with the cradle 22, the switch 20 springs closed to prevent tone ringing, even when the line switches LS-1 to LS-5 are subsequently closed manually. Various examples of suitable switch/magnet assemblies than can be used for this purpose are disclosed in R. M. Kalb U.S. Pat. No. 2,322,851, herein incorporated by reference, or in O. W. Henrickson U.S. Pat. No. 2,673,252, herein incorporated by reference. Preferably, as described in the Kalb patent, the magnet 24 is centered with respect to the handset 21 so that the switch 20 is closed even if the handset is hung up backwards.

When the handset 21 is lifted from the cradle 22, the line-switch contacts change state in conventional fashion, opening the upper set of contacts LS-1 through LS-5 shown in FIG. 1 so as to disconnect the oscillator circuit 16 from both the input telephone lines 12, 13 and from the receiver 11. At this time, a lower set of line-switch contacts closes so as to connect the input lines 12, 13 and the receiver 11 to the speech network (designated "SN"), the details of which are not here pertinent and which can be any standard type of speech network.

Multifrequency Operation

For many applications, it is preferred to use a multifrequency oscillator circuit, such as a conventional dual-frequency oscillator, to generate a two-tone ringing signal; for example, 750 Hz and 1050 Hz switched at a 20 Hz rate in one typical application of the invention. One example of a dual-frequency circuit of this general type is disclosed in the Morstadt patent previously cited. Dual-frequency ringing is important in providing a clearly audible ringing signal for those with impaired hearing, who commonly have some difficulty in hearing a high-frequency tone. One suitable example of a dual-frequency oscillator is to use a 556 timer chip, which is a dual version of the 555 timer chip.

While various specific examples and embodiments of the invention have been described in detail herein, it should be obvious that various modifications may be made from the specific details described, without departing from the spirit and scope of the invention.

What is claimed is:

1. In combination with a tone-ringing circuit for a telephone set of the type wherein, in the on-hook state of a set of line-switch contacts, an incoming low-frequency ringing signal from the central office is rectified and applied to an oscillator circuit having a relatively high-frequency output which is connected to the receiver of the telephone handset to operate the receiver as the transducer for the tone ringer, the improvement which comprises:

a protective switch, responsive to the physical presence of the handset in the cradle independent of the state of the line-switch contacts, which closes when the handset is lifted from the cradle; and means for connecting the protective switch to a "disable" input terminal of the oscillator circuit so as to disable that circuit from producing an output to the receiver whenever the switch is closed, to prevent ringing of the set whenever the handset has been lifted from the cradle, regardless of the state of the line-switch contacts.

2. A combination as recited in claim 1, wherein:
the protective switch comprises a magnetically actuated switch mounted in the telephone cradle facing a portion of the handset surface when on-hook; and a magnet mounted in the facing surface of the handset when on-hook, for changing the state of the switch.

3. A combination as recited in claim 1 or claim 2, wherein the oscillator circuit includes an I-C timer chip having input pins, a high-frequency output pin, and a reset pin, the receiver being connectable by a set of the line-switch contacts between the oscillator output pin and circuit ground when the handset is on-hook, the protective switch being connected between the reset pin of the chip and circuit ground when the handset has been removed from the cradle so as to disable operation of the oscillator chip.

4. A combination as recited in claim 3, wherein the ringing circuit is powered solely by the ringing signal from the central office.

5. A combination as recited in claim 1 or claim 2, wherein the receiver is a U-3 telephone receiver.

6. A tone-ringing circuit for a telephone set having a receiver in the telephone handset and a set of line-switch contacts, which circuit is powered solely by a low-frequency ringing signal from the central office, the circuit comprising:
an oscillator circuit including an I-C timer chip of the type having input pins, a high-frequency output pin, and a reset pin for disabling the high-frequency output;
means for rectifying an incoming low frequency ringing signal from the central office and for applying the rectified signal to the oscillator input pins whenever a set of telephone line switch contacts are in the on-hook state;
means for connecting the high-frequency output to the telephone receiver whenever the line-switch contacts are on-hook so that the high-frequency output operates the receiver as the transducer for the tone ringer; and
means, connected to the reset pin of the chip, for disabling the chip from producing the high-frequency output to the receiver whenever the handset has been lifted from the cradle and the line-switch contacts are thereafter closed, so as to preclude the possibility of a user being rung in the ear.

7. An improved method of operating a tone-ringing circuit for a telephone set of the type wherein, in the on-hook state of a set of line-switch contacts, an incoming low-frequency ringing signal from the central office is rectified and applied to an oscillator circuit having a relatively high-frequency output which in turn drives the receiver of the telephone handset to operate the receiver as the transducer for the tone ringer, wherein the improvement comprises:
connecting a protective switch to a "disable" input terminal of the oscillator circuit so as to disable that circuit from producing an output to the receiver whenever the switch is closed, the switch being closed whenever the handset has been lifted from the cradle so as to prevent ringing of the set whenever the handset has been lifted, regardless of the state of the line-switch contacts.

8. A method as recited in claim 7, wherein the switch is connected to a reset pin of an I-C timer chip included in the oscillator circuit, so as to disable the operation of the oscillator chip whenever the handset has been lifted from the cradle.

9. A method as recited in claim 7 or claim 8, wherein the ringing circuit is powered solely by the ringing signals from the central office.

10. A method of ringing a telephone set having a receiver in the telephone handset and a set of line switch contacts, wherein the ringing circuit is powered solely by a low-frequency ringing signal from the central office, which method comprises:
(a) rectifying an incoming low-frequency ringing signal from the central office whenever the line-switch contacts are in the on-hook state;
(b) applying the rectified signal to input pins of an I-C timer chip whenever the line-switch contacts are on-hook, the chip also having a high-frequency output pin and reset pin for disabling the high-frequency output;
(c) connecting the high-frequency output to the telephone receiver whenever the line-switch contacts are on hook so that the high-frequency output, when not disabled, operates the receiver as the transducer from the tone ringer; and
(d) connecting the reset pin to circuit ground so as to disable the chip from producing the high-frequency output to the receiver whenever the handset has been lifted from the cradle and the line-switch contacts are thereafter closed, so as to preclude the possibility of a user being rung in the ear.

* * * * *